United States Patent
Ziskind et al.

(10) Patent No.: US 10,289,811 B2
(45) Date of Patent: *May 14, 2019

(54) SYSTEMS AND METHODS FOR ENABLING PLAYBACK OF DIGITAL CONTENT USING STATUS ASSOCIABLE ELECTRONIC TICKETS AND TICKET TOKENS REPRESENTING GRANT OF ACCESS RIGHTS

(71) Applicant: DIVX, LLC, San Diego, CA (US)

(72) Inventors: Ben Ziskind, San Marcos, CA (US);
David Smith, Temecula, CA (US);
Ramon Davila, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,534

(22) Filed: Apr. 11, 2017

(65) Prior Publication Data

US 2017/0286643 A1    Oct. 5, 2017

Related U.S. Application Data

(63) Continuation of application No. 14/567,994, filed on Dec. 11, 2014, now Pat. No. 9,626,490, which is a
(Continued)

(51) Int. Cl.
*G06F 21/10* (2013.01)
*H04N 21/2387* (2011.01)

(52) U.S. Cl.
CPC .......... *G06F 21/10* (2013.01); *H04N 21/2387* (2013.01); *G06F 2221/0746* (2013.01)

(58) Field of Classification Search
CPC ................. G06Q 30/02; G06F 21/10
(Continued)

(56) References Cited

U.S. PATENT DOCUMENTS 5,361,332 A    11/1994    Yoshida et al.
5,404,436 A    4/1995    Hamilton
(Continued)

FOREIGN PATENT DOCUMENTS

CN    1525682 A    9/2004
CN    1920840 A    2/2007
(Continued)

OTHER PUBLICATIONS

European Supplementary Search Report for Application 11855237.1, search completed Jun. 12, 2014, 9 pgs.
(Continued)

*Primary Examiner* — Bryan F Wright
(74) *Attorney, Agent, or Firm* — KPPB LLP

(57) ABSTRACT

Systems and methods for accessing digital content using electronic tickets and ticket tokens in accordance with embodiments of the invention are disclosed. In one embodiment, a user device includes a processor, a network interface, and memory configured to store an electronic ticket, and a ticket token, and the processor is configured by an application to send a request for digital content, receive a ticket token from a merchant server, wherein the ticket token is generated by a DRM server and associated with an electronic ticket that enables playback of the requested digital content, send the ticket token to a DRM server, receive an electronic ticket that enables playback of requested digital content, request the digital content associated with the electronic ticket, and play back the requested digital content using the electronic ticket.

22 Claims, 6 Drawing Sheets

Related U.S. Application Data continuation of application No. 13/436,900, filed on Mar. 31, 2012, now Pat. No. 8,918,908.

(60) Provisional application No. 61/583,807, filed on Jan. 6, 2012.

(58) Field of Classification Search
USPC .......................................................... 726/30
See application file for complete search history.

(56) References Cited

U.S. PATENT DOCUMENTS

| | | | |
|---|---|---|---|
| 5,715,403 A | 2/1998 | Stefik | |
| 6,031,622 A | 2/2000 | Ristow et al. | |
| 6,141,754 A | 10/2000 | Choy | |
| 6,195,388 B1 | 2/2001 | Choi et al. | |
| 6,236,971 B1 | 5/2001 | Pirolli et al. | |
| 6,658,056 B1 | 12/2003 | Duruöz et al. | |
| 6,807,306 B1 | 10/2004 | Girgensohn et al. | |
| 6,824,051 B2* | 11/2004 | Reddy | G06F 21/10 235/375 |
| 6,859,496 B1 | 2/2005 | Boroczky et al. | |
| 6,956,901 B2 | 10/2005 | Boroczky et al. | |
| 7,242,772 B1 | 7/2007 | Tehranchi | |
| 7,251,330 B2* | 7/2007 | Terao | G06F 21/10 380/255 |
| 7,330,974 B1 | 2/2008 | Lapstun et al. | |
| 7,421,411 B2 | 9/2008 | Kontio et al. | |
| 7,478,325 B2 | 1/2009 | Foehr | |
| 8,023,562 B2 | 9/2011 | Zheludkov et al. | |
| 8,046,453 B2 | 10/2011 | Olaiya | |
| 8,054,880 B2 | 11/2011 | Yu et al. | |
| 8,225,061 B2 | 7/2012 | Greenebaum | |
| 8,233,768 B2 | 7/2012 | Soroushian et al. | |
| 8,249,168 B2 | 8/2012 | Graves | |
| 8,270,473 B2 | 9/2012 | Chen et al. | |
| 8,270,819 B2 | 9/2012 | Vannier | |
| 8,289,338 B2 | 10/2012 | Priyadarshi et al. | |
| 8,311,115 B2 | 11/2012 | Gu et al. | |
| 8,321,556 B1 | 11/2012 | Chatterjee et al. | |
| 8,386,621 B2 | 2/2013 | Park | |
| 8,412,841 B1 | 4/2013 | Swaminathan et al. | |
| 8,428,757 B2* | 4/2013 | Nunokawa | G11B 27/105 700/94 |
| 8,456,380 B2 | 6/2013 | Pagan | |
| 8,472,792 B2 | 6/2013 | Butt | |
| 8,787,570 B2 | 7/2014 | Braness et al. | |
| 8,806,188 B2 | 8/2014 | Braness et al. | |
| 8,914,534 B2 | 12/2014 | Braness et al. | |
| 8,918,636 B2 | 12/2014 | Kiefer | |
| 8,918,908 B2 | 12/2014 | Ziskind et al. | |
| 8,997,254 B2 | 3/2015 | Amidei et al. | |
| 9,626,490 B2 | 4/2017 | Ziskind et al. | |
| 2003/0002578 A1 | 1/2003 | Tsukagoshi et al. | |
| 2003/0065777 A1 | 4/2003 | Mattila et al. | |
| 2003/0069904 A1 | 4/2003 | Hsu et al. | |
| 2003/0152370 A1 | 8/2003 | Otomo et al. | |
| 2003/0231863 A1 | 12/2003 | Eerenberg et al. | |
| 2003/0231867 A1 | 12/2003 | Gates | |
| 2003/0236836 A1 | 12/2003 | Borthwick | |
| 2003/0236907 A1 | 12/2003 | Stewart et al. | |
| 2004/0019801 A1 | 1/2004 | Lindholm et al. | |
| 2004/0024688 A1 | 2/2004 | Bi et al. | |
| 2004/0039916 A1 | 2/2004 | Aldis et al. | |
| 2004/0103064 A1* | 5/2004 | Howard | G06Q 30/02 705/55 |
| 2004/0125957 A1* | 7/2004 | Rauber | G06Q 20/04 380/259 |
| 2004/0136698 A1 | 7/2004 | Mock | |
| 2004/0181667 A1* | 9/2004 | Venters, III | G06F 21/10 713/164 |
| 2004/0225751 A1 | 11/2004 | Urali et al. | |
| 2005/0038826 A1 | 2/2005 | Bae et al. | |
| 2005/0070257 A1* | 3/2005 | Saarinen | G07B 15/00 455/414.1 |
| 2005/0097327 A1* | 5/2005 | Ondet | G06Q 20/02 713/171 |
| 2005/0114896 A1 | 5/2005 | Hug | |
| 2005/0149450 A1 | 7/2005 | Stefik et al. | |
| 2005/0193070 A1 | 9/2005 | Brown et al. | |
| 2005/0193322 A1 | 9/2005 | Lamkin et al. | |
| 2005/0204289 A1 | 9/2005 | Mohammed et al. | |
| 2005/0207442 A1 | 9/2005 | van Zoest et al. | |
| 2005/0207578 A1 | 9/2005 | Matsuyama et al. | |
| 2005/0210101 A1 | 9/2005 | Janik | |
| 2005/0273695 A1 | 12/2005 | Schnurr | |
| 2005/0275656 A1 | 12/2005 | Corbin et al. | |
| 2006/0078301 A1 | 4/2006 | Ikeda et al. | |
| 2006/0129909 A1 | 6/2006 | Butt et al. | |
| 2006/0173887 A1 | 8/2006 | Breitfeld et al. | |
| 2006/0242069 A1* | 10/2006 | Peterka | G06F 21/10 705/50 |
| 2006/0245727 A1 | 11/2006 | Nakano et al. | |
| 2006/0259588 A1 | 11/2006 | Lerman et al. | |
| 2006/0263056 A1 | 11/2006 | Lin et al. | |
| 2007/0031110 A1 | 2/2007 | Rijckaert | |
| 2007/0047901 A1 | 3/2007 | Ando et al. | |
| 2007/0083617 A1 | 4/2007 | Chakrabarti et al. | |
| 2007/0086528 A1 | 4/2007 | Mauchly et al. | |
| 2007/0100757 A1 | 5/2007 | Rhoads | |
| 2007/0136817 A1 | 6/2007 | Nguyen | |
| 2007/0140647 A1 | 6/2007 | Kusunoki et al. | |
| 2007/0154165 A1 | 7/2007 | Hemmeryckz-Deleersnijder et al. | |
| 2007/0168541 A1 | 7/2007 | Gupta et al. | |
| 2007/0180125 A1 | 8/2007 | Knowles et al. | |
| 2007/0185982 A1 | 8/2007 | Nakanowatari et al. | |
| 2007/0239839 A1 | 10/2007 | Buday et al. | |
| 2007/0271455 A1* | 11/2007 | Nakano | G06Q 20/1235 713/154 |
| 2007/0292107 A1 | 12/2007 | Yahata et al. | |
| 2007/0294772 A1 | 12/2007 | Hydrie et al. | |
| 2008/0066181 A1 | 3/2008 | Haveson et al. | |
| 2008/0101466 A1 | 5/2008 | Swenson et al. | |
| 2008/0109911 A1* | 5/2008 | Tedesco | G06F 21/10 726/30 |
| 2008/0126248 A1 | 5/2008 | Lee et al. | |
| 2008/0137736 A1 | 6/2008 | Richardson et al. | |
| 2008/0192818 A1 | 8/2008 | DiPietro et al. | |
| 2008/0256105 A1 | 10/2008 | Nogawa et al. | |
| 2008/0263354 A1 | 10/2008 | Beuque et al. | |
| 2008/0279535 A1 | 11/2008 | Haque et al. | |
| 2008/0310496 A1 | 12/2008 | Fang | |
| 2009/0031220 A1 | 1/2009 | Tranchant et al. | |
| 2009/0037959 A1 | 2/2009 | Suh et al. | |
| 2009/0060452 A1 | 3/2009 | Chaudhri | |
| 2009/0066839 A1 | 3/2009 | Jung et al. | |
| 2009/0132599 A1 | 5/2009 | Soroushian et al. | |
| 2009/0132721 A1 | 5/2009 | Soroushian et al. | |
| 2009/0132824 A1 | 5/2009 | Terada et al. | |
| 2009/0150557 A1 | 6/2009 | Wormley et al. | |
| 2009/0169181 A1 | 7/2009 | Priyadarshi et al. | |
| 2009/0201988 A1 | 8/2009 | Gazier et al. | |
| 2009/0226148 A1 | 9/2009 | Nesvadba et al. | |
| 2009/0228395 A1* | 9/2009 | Wegner | G06F 21/10 705/59 |
| 2009/0293116 A1 | 11/2009 | DeMello | |
| 2009/0303241 A1 | 12/2009 | Priyadarshi et al. | |
| 2009/0307258 A1 | 12/2009 | Priyadarshi et al. | |
| 2009/0307267 A1 | 12/2009 | Chen et al. | |
| 2009/0313544 A1 | 12/2009 | Wood et al. | |
| 2009/0313564 A1 | 12/2009 | Rottler et al. | |
| 2009/0328124 A1 | 12/2009 | Khouzam et al. | |
| 2010/0017501 A1 | 1/2010 | Yen et al. | |
| 2010/0040351 A1 | 2/2010 | Toma et al. | |
| 2010/0083322 A1 | 4/2010 | Rouse | |
| 2010/0094969 A1 | 4/2010 | Zuckerman et al. | |
| 2010/0095121 A1 | 4/2010 | Shetty et al. | |
| 2010/0111192 A1 | 5/2010 | Graves | |
| 2010/0115631 A1 | 5/2010 | Milstein | |
| 2010/0131760 A1 | 5/2010 | Fujita | |
| 2010/0138903 A1 | 6/2010 | Medvinsky | |
| 2010/0158109 A1 | 6/2010 | Dahlby et al. | |

(56) References Cited

U.S. PATENT DOCUMENTS

| | | |
|---|---|---|
| 2010/0189183 A1 | 7/2010 | Gu et al. |
| 2010/0228795 A1 | 9/2010 | Hahn |
| 2010/0235472 A1 | 9/2010 | Sood et al. |
| 2010/0250389 A1 | 9/2010 | Augustin et al. |
| 2011/0029999 A1 | 2/2011 | Foti et al. |
| 2011/0047209 A1 | 2/2011 | Lindholm et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0126191 A1 | 5/2011 | Hughes et al. |
| 2011/0129011 A1 | 6/2011 | Cilli et al. |
| 2011/0142415 A1 | 6/2011 | Rhyu |
| 2011/0150100 A1 | 6/2011 | Abadir |
| 2011/0153785 A1 | 6/2011 | Minborg et al. |
| 2011/0225417 A1 | 9/2011 | Maharajh et al. |
| 2011/0239078 A1 | 9/2011 | Luby et al. |
| 2011/0246659 A1 | 10/2011 | Bouazizi |
| 2011/0268178 A1 | 11/2011 | Park et al. |
| 2011/0276585 A1 | 11/2011 | Wagner et al. |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0265562 A1 | 10/2012 | Daouk et al. |
| 2012/0278496 A1 | 11/2012 | Hsu |
| 2012/0307883 A1 | 12/2012 | Graves |
| 2012/0324552 A1* | 12/2012 | Padala ................ G06F 21/10 726/6 |
| 2013/0007467 A1 | 1/2013 | Chan et al. |
| 2013/0044821 A1 | 2/2013 | Braness et al. |
| 2013/0046902 A1 | 2/2013 | Villegas Nuñez et al. |
| 2013/0054958 A1 | 2/2013 | Braness et al. |
| 2013/0061045 A1 | 3/2013 | Kiefer et al. |
| 2013/0166906 A1 | 6/2013 | Swaminathan et al. |
| 2013/0179199 A1 | 7/2013 | Ziskind et al. |
| 2013/0179992 A1 | 7/2013 | Ziskind et al. |
| 2013/0226635 A1 | 8/2013 | Fisher |
| 2014/0101722 A1 | 4/2014 | Moore |
| 2014/0108497 A1* | 4/2014 | Yao ................ H04N 21/2387 709/203 |
| 2015/0096060 A1 | 4/2015 | Ziskind et al. |

FOREIGN PATENT DOCUMENTS

| | | |
|---|---|---|
| CN | 101013455 A | 8/2007 |
| CN | 104508648 A | 4/2015 |
| CN | 104508648 B | 4/2017 |
| EP | 0813167 A2 | 12/1997 |
| EP | 2801048 A2 | 11/2014 |
| HK | 1199120 A1 | 6/2015 |
| JP | 08263438 A | 10/1996 |
| JP | 2002522995 A | 7/2002 |
| JP | 2003323343 A | 11/2003 |
| JP | 2003330896 A | 11/2003 |
| JP | 2008262365 A | 10/2008 |
| JP | 2011233153 A | 11/2011 |
| JP | 2015515762 A | 5/2015 |
| JP | 5837234 B2 | 12/2015 |
| KR | 20100109472 A | 10/2010 |
| KR | 20140110028 A | 9/2014 |
| KR | 101707435 B1 | 2/2017 |
| WO | 03096136 A2 | 11/2003 |
| WO | 2004102571 A1 | 11/2004 |
| WO | 2007106844 A2 | 9/2007 |
| WO | 2009065137 A1 | 5/2009 |
| WO | 2009065144 A1 | 5/2009 |
| WO | 2010060106 A1 | 5/2010 |
| WO | 2010122447 A1 | 10/2010 |
| WO | 2012094171 A1 | 7/2012 |
| WO | 2012094181 A2 | 7/2012 |
| WO | 2012094189 A1 | 7/2012 |
| WO | 2013103986 A2 | 7/2013 |
| WO | 2013103986 A3 | 7/2013 |

OTHER PUBLICATIONS

Federal Computer Week, "Tool Speeds Info to Vehicles", Jul. 25, 1999, 5 pages.
InformationWeek, "Internet on Wheels", InformationWeek: Front End: Daily Dose, Jul. 20, 1999, Printed on Mar. 26, 2014, 3 pgs.
International Preliminary Report on Patentability for International Application PCT/US2013/020572, Report issued Dec. 9, 2014, dated Dec. 18, 2014, 9 Pgs.
International Search Report and Written Opinion for International Application PCT/US2011/067243, completed Apr. 24, 2012, dated May 8, 2012, 8 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2013/020572, completed Mar. 19, 2013, dated Apr. 29, 2013, 10 pgs.
"HTTP Live Streaming Overview, Network & Internet", Apple, Inc., Apr. 1, 2011, 38 pages.
Clarke, "IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
ITS International, "Fleet System Opts for Mobile Server", Aug. 26, 1999, Printed on Oct. 24, 2011 from http://www.itsinternational.com/News/article.cfm?recordID=547, 1 page.
Microsoft Media Platform: Player Framework, "Silverlight Media Framework v1.1", Jan. 2010, 2 pages.
Microsoft Media Platform: Player Framework, "Microsoft Media Platform: Player Framework v2.5 (formerly Silverlight Media Framework)", May 3, 2011, 2 pages.
Supplementary European Search Report for European Application No. 13733630.1, Search completed May 19, 2016, dated Jun. 1, 2016, 10 Pgs.
The Official Microsoft IIS Site, "Smooth Streaming Client", Sep. 24, 2010, 4 pages.
"Adaptive Streaming Comparison", Jan. 28, 2010, 5 pgs.
"Best Practices for Multi-Device Transcoding", Kaltura Open Source Video, Apr. 1, 2012, retrieved from https://web.archive.org/web/20120401172925/knowledge.kaltura.com/best-practices-multi-device-transcoding on Jul. 10, 2017, 9 pages.
"IBM Spearheading Intellectual Property Protection Technology for Information on the Internet; Cryptolope Containers Have Arrived", Business Wire, May 1, 1996, Printed on Aug. 1, 2014 from http://www.thefreelibrary.com/IBM+Spearheading+Intellectual+Property+Protection+Technology+for . . .-a018239381, 6 pages.
"Netflix turns on subtitles for PC, Mac streaming", Yahoo! News, Apr. 21, 2010, Printed on Mar. 26, 2014, 3 pgs.
"Supported Media Formats", Supported Media Formats, Android Developers, Oct. 23, 2011, Printed on Nov. 27, 2013 from https://web.archive.org/web/20111023041339/developer.android.com/guide/appendix/media-formats.html, 5 pgs.
"Thread: SSME (Smooth Streaming Medial Element) config.xml review (Smooth Streaming Client configuration file)", Oct. 7, 2010, printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, Feb. 11, 2012, retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs.

(56) References Cited

OTHER PUBLICATIONS

Akhshabi et al., "An Experimental Evaluation of Rate-Adaptation Algorithms in Adaptive Streaming over HTTP", MMSys'11, Feb. 23-25, 2011, San Jose, CA, USA, 12 pgs.
Anonymous, "Method for the encoding of a compressed video sequence derived from the same video sequence compressed at a different bit rate without loss of data", ip.com, ip.com number: IPCOM000008165D, May 22, 2002, pp. 1-9.
Author Unknown, "Tunneling QuickTime RTSP and RTP over HTTP", Published by Apple Computer, Inc., 1999, 6 pages.
Deutscher "IIS Transform Manager Beta—Using the MP4 to Smooth Task", Apr. 29, 2011, retrieved from: https://web.archive.org/web/20130328111303/http://blog.johndeutscher.com/category/smooth-streaming, 14 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", MSDN Magazine, Mar. 2010, retrieved from http://msdn.microsoft.com/en-us/magazine/ee336025.aspx, 15 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
Kim, Kyuheon, "MPEG-2 ES/PES/TS/PSI", Kyung-Hee University, Oct. 4, 2010, 66 pages.
Kurzke et al., "Get Your Content Onto Google TV", Google, 2012, retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-2010-Expression-Encoder.pdf, 20 pgs.
Levkov, "Mobile Encoding Guidelines for Android Powered Devices", Adobe Systems Inc., Addendum B, Dec. 22, 2010, 42 pgs.
MSDN, "Adaptive streaming, Expression Studio 2.0", Apr. 23, 2009, 2 pgs.
Nelson, "Smooth Streaming Deployment Guide", Microsoft Expression Encoder, Aug. 2010, 66 pgs.
Nelson, Michael, "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt on Apr. 25, 2014, 12 pages.
Noe, A., "Matroska File Format (under construction!)", Jun. 24, 2007, retrieved from the Internet: URL:http://web.archive.org web/20070821155146/www.matroska.org/technical/specs/matroska.pdf Jan. 19, 2011, 51 pages.
Ooyala, "Widevine Content Protection", Ooyala Support Center for Developers, Ooyala, Inc., Jun. 3, 2013, retrieved from http://support.ooyala.com/developers/documentation/concepts/player_v3_widevine_integration.html, 7 pages.
Ozer, "The 2012 Encoding and Transcoding Buyers' Guide", Streamingmedia.com, Aug.-Sep. 2012, retrieved from: http://www.streamingmedia.com/Articles/Editorial/Featured-Articles/The-2012-Encoding-and-Transcoding-Buyers-Guide-84210.aspx, 8 pgs.
Pantos et al., "HTTP Live Streaming, draft-pantos-http-live-streaming-10", Apple, Inc.: IETF Tools, Oct. 15, 2012, retrieved from http://tools.ietf.org/html/draft-pantos-http-live-streaming-10, 37 pgs.
Pantos et al., "HTTP Live Streaming: draft-pantos-http-live-streaming-06", Apple, Inc.: IETF Tools, Mar. 31, 2011, 24 pages.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne et al., "Real Time Streaming Protocol 2.0 (RTSP): draft-ietfmmusic-rfc2326bis-27", MMusic Working Group of the Internet Engineering Task Force (IETF), Mar. 9, 2011, 296 pages.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
U.S. Appl. No. 13/224,298, "Final Office Action Received", dated May 19, 2014, 27 pages.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", , Microsoft Corporation, Mar. 2009, 17 pages.

\* cited by examiner

SYSTEMS AND METHODS FOR ENABLING PLAYBACK OF DIGITAL CONTENT USING STATUS ASSOCIABLE ELECTRONIC TICKETS AND TICKET TOKENS REPRESENTING GRANT OF ACCESS RIGHTS

CROSS-REFERENCE TO RELATED APPLICATIONS

The present application claims priority under 35 U.S.C. 120 as a continuation of U.S. patent application Ser. No. 14/567,994, entitled "Systems and Methods for Enabling Playback of Digital Content Using Electronic Tickets and Ticket Tokens Representing Grant of Access Rights" to Ziskind et al., filed Dec. 11, 2014, which claims priority under 35 U.S.C. 120 as a continuation of U.S. patent application Ser. No. 13/436,900, entitled "Systems And Methods For Accessing Digital Content Using Electronic Tickets And Ticket Tokens," to Ziskind et al., filed Mar. 31, 2012 and issued on Jul. 11, 2013 as U.S. Pat. No. 8,918,908, which claims priority under 35 U.S.C. 119(e) to U.S. Provisional Application No. 61/583,807, entitled "Web Player Registration With DRM Playback" to Ziskind et al., filed Jan. 6, 2012, the disclosures of which are incorporated herein by reference in their entireties.

FIELD OF THE INVENTION

The present invention relates generally to digital rights management (DRM) systems and more specifically to authentication of user devices when purchasing and requesting access to DRM protected multimedia content.

BACKGROUND OF THE INVENTION

When a customer visits a movie theater, the process typically involves purchasing a "ticket" at the ticket booth and having the ticket "torn" when the customer enters the theater. A ticket serves as a physical proof of purchase for the right to view a particular movie. A ticket can change possession from the purchaser to another customer and can be used by either person. When a ticket is claimed by entering the theater and being torn, the ticket is thought to be redeemed by the customer presenting the ticket and henceforth the viewing rights granted by the ticket are owned by that customer.

In a digital multimedia playback system, viewing rights are generally governed by possession of physical media that contains digital content. When the content is not tied to physical media, such as when digital content is streamed over a network, a digital rights management (DRM) system is often used to restrict access to the content. Such systems typically involve user accounts and associating purchased content with a user account. A user device may be registered to a user account and then have access to the content purchased under that user account.

SUMMARY OF THE INVENTION

Systems and methods for accessing digital content using electronic tickets and ticket tokens in accordance with embodiments of the invention are disclosed. In one embodiment, a user device includes a processor, a network interface, and memory configured to store an electronic ticket and a ticket token, and the processor is configured by an application to send a request for digital content, receive a ticket token from a merchant server, wherein the ticket token is generated by a DRM server and associated with an electronic ticket that enables playback of the requested digital content, send the ticket token to a DRM server, receive an electronic ticket that enables playback of requested digital content, request the digital content associated with the electronic ticket, and play back the requested digital content using the electronic ticket.

In a further embodiment, the electronic ticket includes a torn status.

In another embodiment, the electronic ticket is an XML file.

In a still further embodiment, the electronic ticket identifies the purchased digital content.

In still another embodiment, the electronic ticket includes a characteristic of the purchased content selected from the group of information identifying the content that was purchased, a license indicating how the content can be played back, a purchase price, a merchant transaction identifier, the identification of a customer who purchased the ticket, and the identification of a customer owning the ticket.

In a yet further embodiment, the electronic ticket is associated with cryptographic data that can be used to access the digital content to which the electronic ticket refers.

In yet another embodiment, the ticket token references the electronic ticket, a customer, and the requested digital content.

In a further embodiment again, the processor is further configured to receive access information for the digital content.

In another embodiment again, the access information includes at least one piece of information selected from the group of a top level index of the digital content, an identifier for the digital content, and cryptographic data that can be used to access the digital content.

In a further additional embodiment, the electronic ticket is embedded in the header of a multimedia file.

Another additional embodiment includes sending a request for digital content from a user device to a merchant server, receiving a ticket token from the merchant server using the user device, where the ticket token is generated by a DRM server and associated with an electronic ticket that enables playback of the requested digital content, sending the ticket token to a DRM server using the user device, receiving the electronic ticket from the DRM server using the user device, downloading the digital content associated with the electronic ticket from a content server using the user device, and playing back the requested digital content.

In a still yet further embodiment, the electronic ticket includes a torn status.

In still yet another embodiment, the electronic ticket is an XML file.

In a still further embodiment again, the electronic ticket identifies the purchased digital content.

In still another embodiment again, the electronic ticket includes a characteristic of the purchased content selected from the group of information identifying the content that was purchased, a license indicating how the content can be played back, a purchase price, a merchant transaction identifier, the identification of a customer who purchased the ticket, and the identification of a customer owning the ticket.

In a still further additional embodiment, the electronic ticket is associated with cryptographic data that can be used to access the digital content to which the electronic ticket refers.

In still another additional embodiment, the ticket token references the electronic ticket, a customer, and the requested digital content.

A yet further embodiment again includes receiving access information for the digital content.

In yet another embodiment again, the access information includes at least one piece of information selected from the group of a top level index of the digital content, an identifier for the digital content, and cryptographic data that can be used to access the content.

In a yet further additional embodiment, the electronic ticket is embedded in the header of a multimedia file.

DETAILED DISCLOSURE OF THE INVENTION

Turning now to the drawings, systems and methods for accessing digital content using electronic tickets and ticket tokens are illustrated. In many embodiments, a user device can communicate with merchant servers, digital rights management (DRM) servers, and content servers to request access to and play back digital content. A user device may be configured with a web browser, web application, or other application that provides a user interface to a customer. The interface typically displays the digital content available from a merchant and is populated with data from the merchant server.

In many embodiments, a user device can purchase the right to access digital content from a merchant server. However, the user device obtains the cryptographic information used to access the purchased content directly from a DRM server. In several embodiments, a merchant server requests that the DRM server issue the right to access a piece of digital content to one of its customers. In response to the request, the DRM server generates an electronic ticket. The DRM server can also generate a ticket token associated with the electronic ticket at that time and/or when a user device requests playback of the content via the merchant website. The electronic ticket is evidence of the right of a user device registered with the DRM server to playback DRM protected content. The ticket token is a temporary credential that can be used to obtain the electronic ticket from the DRM server by a playback device that is registered with the DRM server and/or to obtain cryptographic information enabling playback of the content from the DRM server. In many instances the DRM server cannot authenticate the user device that is purchasing the content from the merchant server. The DRM server can provide the ticket token to the merchant server, which passes the ticket token to the user device used to purchase the content. Provided the user device or another user device onto which the token is loaded is registered with the DRM server, the user device can provide the ticket token to the DRM server and obtain the electronic ticket and any cryptographic information needed to access the purchased content. At which point, the user device can request the DRM protected content from the content server and commence playback using the cryptographic information. The use of electronic tickets, and ticket tokens to authenticate the right of a user device to playback digital content in accordance with embodiments of the invention is discussed further below.

System Architecture

Figure 1:
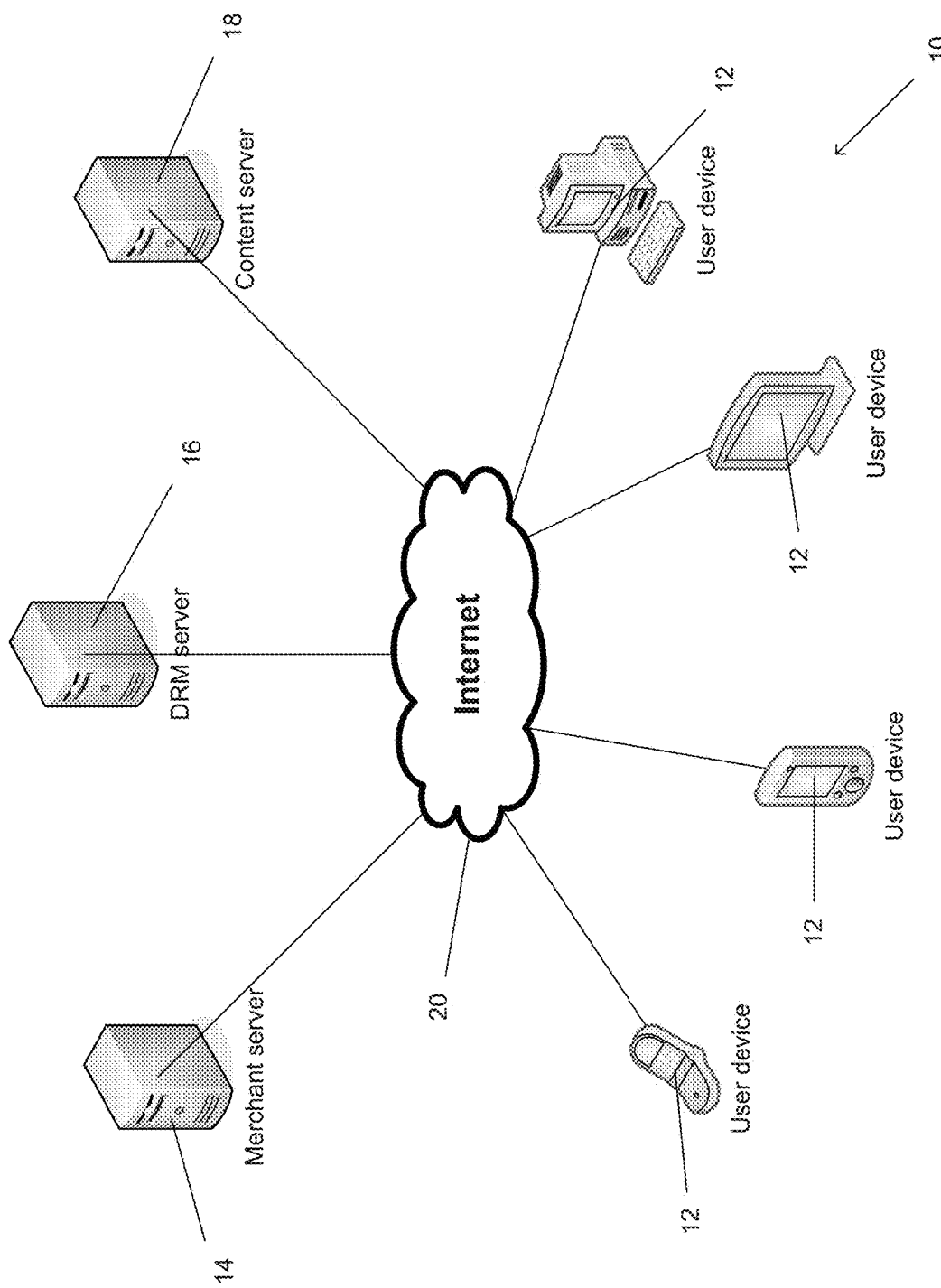
FIG. 1 is a system-level overview illustrating a DRM and content distribution system in accordance with an embodiment of the invention.

A system including user devices that can communicate with merchant servers, DRM servers and content servers to access digital content in accordance with an embodiment of the invention is illustrated in FIG. 1. The system 10 includes a number of different types of user device 12 that each has the capability to request digital content over a network. The user devices 12 communicate with a merchant server 14, digital rights management (DRM) server 16 and content server 18 over a network such as the Internet 20. In a number of embodiments, merchant server 14 provides a "store front" like interface accessible to customers via a web browser or other application on their user device 12. The DRM server 16 can be used to authenticate user devices 12 and provide cryptographic information used to access digital content. In several embodiments, the content server 18 is a server that can deliver digital content to the user devices 12. The content can be downloaded and/or streamed by the user devices 12.

An electronic ticket issued by the DRM server in response to the purchase of content that serves as a representation of the purchase can be used to facilitate access of the purchased content in a coordinated fashion among the user device 12, merchant server 14, DRM server 16, and content server 18. In many embodiments, however, the merchant server 14 is unable to authenticate the user device 12 that purchased the content to the DRM server 16. Accordingly, the DRM server 16 issues a ticket token to the merchant server 14 that acts as a temporary credential. In several embodiments, the ticket token is a single use credential that can be utilized by a user device that authenticates itself to the DRM server to obtain the electronic ticket and/or cryptographic information enabling playback of the content. In a number of embodiments, the ticket token is generated when the user device requests playback of the content and expires within a predetermined period of time. In other embodiments, the ticket token, is generated when the user device purchases the content.

The merchant server 14 can provide the ticket token to the user device 12 that purchased the content. Provided the user device 12 is registered with the DRM server 16, the user device 12 can authenticate itself to the DRM server and exchange the ticket token for the electronic ticket that evidences the user device's right to access the purchased content. Where the user device 12 that purchased the content is not authorized to participate within the DRM system administered by the DRM server 16, the ticket token can be transferred to a device that is capable of participating within the DRM system. In embodiments where the DRM server registers user devices with user accounts, DRM system can provide an electronic ticket to a registered user device and can associate the electronic ticket with the user account to which the device is registered. In this way, other user devices registered to the user account can request access to the purchased content following the initial exchange of the ticket token for the electronic ticket. In instances where the user device has previously requested playback of the content, the user device can be in possession of the electronic ticket. When the user device again requests playback of the content via the merchant website (for example by streaming), the merchant can provide the electronic ticket to the DRM server to obtain a ticket token. The user device can then use the ticket token to access the content in the manner outlined above and the DRM server can authenticate that the electronic ticket provided by the merchant server is associated with the user device attempting to play back the content prior to providing cryptographic information enabling play back of the content to the user device.

Although a specific architecture is shown in FIG. 1 any of a variety of architectures can be utilized that enable user devices to securely access digital content using electronic tickets and ticket tokens in accordance with embodiments of the invention. For example, each of the servers illustrated in FIG. 1 can be a server system comprising multiple load balanced servers and/or servers that perform different functions. In addition, the functions of the servers illustrated in FIG. 1 can be combined and/or divided amongst different servers and server systems in accordance with embodiments of the invention. Electronic tickets, ticket tokens, and the use of tickets to access digital content in accordance with embodiments of the invention are discussed further below.

Electronic Tickets

An electronic ticket represents the purchased right to access a piece of digital content. Electronic tickets can also be used to represent the right to playback any DRM protected content including free content that is not capable of being freely distributed and content played back under a subscription agreement. Accordingly, references to purchased content can be considered to encompass more than just requests to access DRM protected content that involve a direct payment and can extend to any request for access to content. An electronic ticket can be a string, binary data, or other electronic representation of information that includes at least a unique identifier for the content with which the electronic ticket is associated.

Electronic tickets typically remain valid for the life of the purchase. When the purchase is a rental of the content, the ticket may be expired after the rental period. A ticket can initially be in a conceptually "untorn" state before it is used to access content. It is not yet associated with any particular user account and/or user device, and can be transferred from the purchaser to any other user, for instance as a gift. The electronic ticket may be "torn" and associated with a user account and/or user device that then holds the exclusive rights granted by that ticket. Whether a DRM system associates an electronic ticket with a user account or a user device can depend on whether the DRM system grants access rights on a device or user basis. Thereafter, that user account and/or user device is considered the owner or holder of the ticket. An electronic ticket may be torn, for example, when it is used for the first time to access content or in response to a user device exchanging a ticket token for an electronic ticket (see discussion below). An electronic ticket's torn or untorn status can be indicated by a variety of methods including (but not limited to) a field within the ticket or an associated field in a database where the ticket is stored.

An electronic ticket may be expressed in a variety of formats that can store the associated information. One suitable format is Extensible Markup Language (XML) defined in the XML 1.0 Specification by the World Wide Web Consortium (W3C) of Cambridge, Mass. and related specifications. XML specifies a textual data format for documents to be both human-readable and machine-readable.

In many embodiments of the invention, an electronic ticket may contain, reference, or be associated with some characteristics of the purchase it represents. Characteristics can include (but are limited to) the content that was purchased, the license describing how the content can be played (high definition or standard definition, rental or purchase, download or streaming, etc.), the purchase price, the merchant transaction identifier (ID), the customer who purchased the ticket, the customer owning the ticket if the ticket is torn. Cryptographic information that can be used to decode or decrypt the digital content may also be associated with a ticket. The characteristics or cryptographic information may be stored as part of the electronic ticket or the ticket may have a pointer or identifier to where the information may be found.

Ticket Token

A ticket token can be generated and associated with an electronic ticket as a temporary credential, which can be exchanged for an electronic ticket by a user device that is registered with a DRM system. In many embodiments, a merchant server requests a ticket token from a DRM server when a user request playback of content. In several embodiments, the merchant server requests a ticket token from the server when the user purchases content. The request may contain information such as (but not limited to) a content identifier, a merchant identifier, an account link identifier, a license identifier, a stream identifier, a transaction identifier, currency, and/or price. The ticket token that is returned may reference the electronic ticket, customer, and current content request. The first time the user device requests playback, the user device can exchange the ticket token for an electronic ticket. After the user device has obtained the electronic ticket, a further playback request can identify the electronic ticket and a DRM server can issue a ticket token that is used to authenticate that the user device attempting to playback the content is registered to the user account with which the electronic tickets is associated.

In several embodiments, the merchant server provides the ticket token to a user device only after the user device or a user account enabled on the user device is authenticated by the merchant server. The DRM server can issue the ticket token without authenticating the user device. The authentication occurs when the ticket token is used to request playback of the content and/or exchanged for the electronic ticket by a user device. In many embodiments, the DRM server may determine when a session is complete and expire the token, or expire the token after a certain amount of time has passed. Moreover, a token can typically only be used once. Methods for granting access to DRM protected content using electronic tickets and associated ticket tokens in accordance with embodiments of the invention are discussed further below.

Obtaining a Ticket and Ticket Token to Facilitate Playback

Typically a customer will buy or otherwise request access to digital content on a merchant's web site or through some other type of interface that shows the merchant's digital content offerings. The customer may use a personal computer with a web browser application, a user device with an on-screen interface, or other interactive user device to view the merchant's offerings. The customer typically has an account with the merchant and logs in using the account, or first creates a new account if there is no existing account. The purchased content can be viewed in the future (i.e., the associated electronic ticket is untorn) or immediately played back. In several embodiments, the content is streamed and/or viewed while it is being downloaded.

Figure 2:
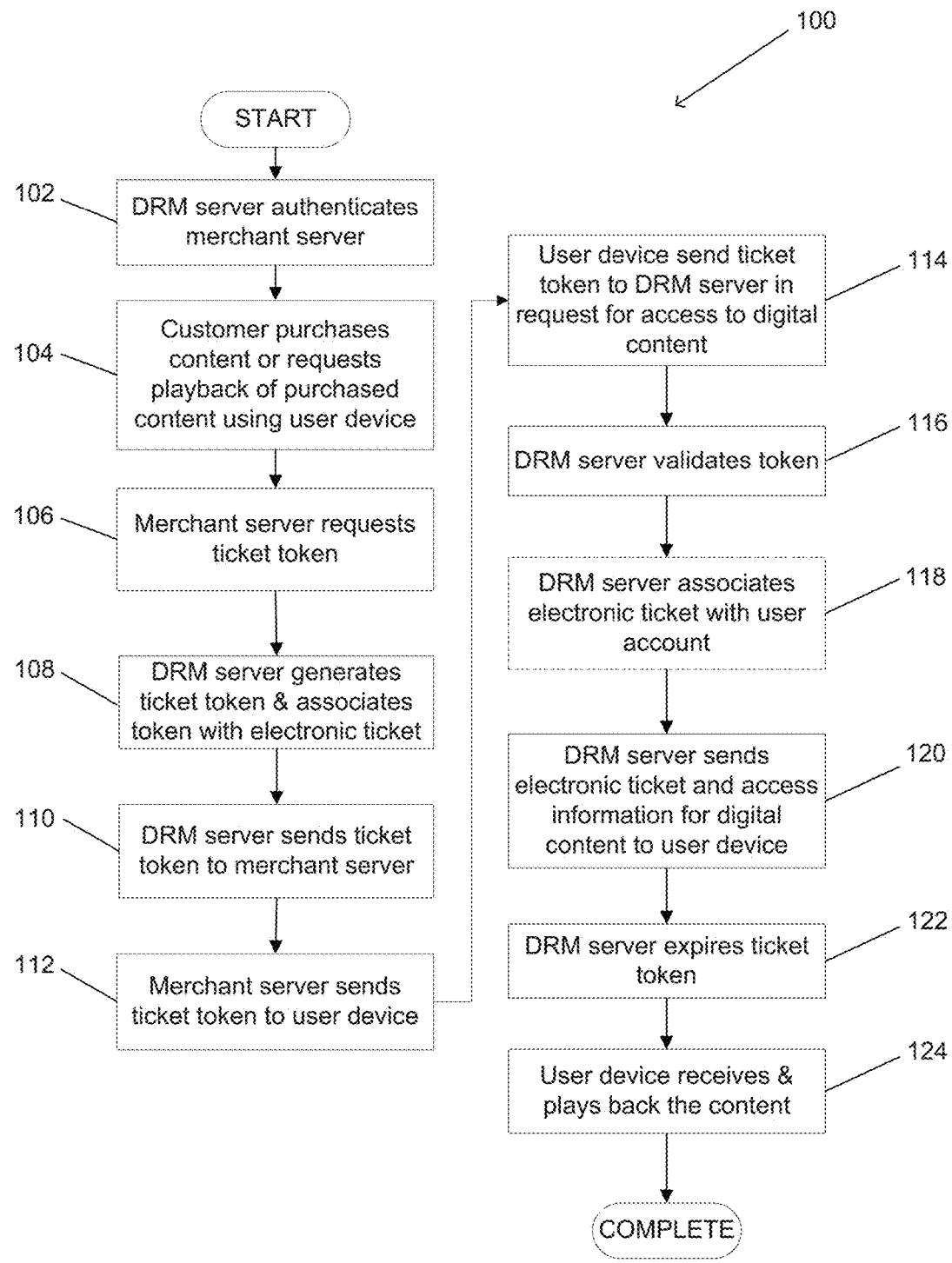
FIG. 2 is a flow chart illustrating a process for providing a user device with access to digital content using an electronic ticket and ticket token, in accordance with an embodiment of the invention.

In many embodiments, the process of purchasing and playing back content involves a merchant obtaining a ticket token from a DRM server. A user device that obtains the ticket token can exchange it with the DRM server for an electronic ticket evidencing the user device's right to play back the purchased content and cryptographic information necessary to play back the purchased content. A process 100 for granting user devices with access to digital content purchased via a merchant using an electronic ticket and an associated electronic token in accordance with an embodiment of the invention is shown in FIG. 2.

A DRM server authenticates (102) a merchant server. Authentication may involve establishing a certain level of identification and trust between the merchant server and the DRM server and/or the DRM system to which the DRM server belongs.

A user device sends (104) a request for digital content to a merchant server.

The merchant server sends (106) a request for a ticket token to a DRM server. If it is a new purchase, an electronic ticket may not yet exist and the merchant server may also request that a new electronic ticket be created to represent the purchase. In several embodiments of the invention, the request may also include information to be associated with the purchase. The information may include (but is not limited to) a content identifier, merchant link identifier, account link identifier, license identifier, stream identifier, transaction identifier, currency, and/or price.

The DRM server generates (108) a ticket token and associates the token with the electronic ticket that represents the purchase. If it is a new purchase, the DRM server creates a new electronic ticket. If playback is requested of content that was previously purchased and played back by a user device registered to a user's account with the DRM server, the ticket token is associated with the existing electronic ticket. In various embodiments of the invention, the digital content may be transferring via a streaming protocol for immediate viewing or downloaded at a later time to be viewed in a disconnected playback mode (i.e., not in immediate communication with a server). If streamed immediately, the electronic ticket may be "torn" immediately. If the content is to be downloaded at a later time, the electronic ticket may be "untorn" and retain the ability to be transferred to another customer before being "torn" and associated with that customer's account. The electronic ticket may be stored on a user device, deleted from the device when playback is requested, and embedded in a container file with the content for disconnected playback as will be discussed further below.

The DRM server sends (110) the ticket token to the merchant server. If the merchant server does not yet have the electronic ticket (e.g., for a new purchase), the DRM server can also send the electronic ticket. In many embodiments, the merchant server stores the electronic ticket for future reference.

The merchant server sends (112) the ticket token to the user device.

The user device sends (114) the ticket token to the DRM server. In the communication with the DRM server, the user device may also send information about the customer and/or the device that identifies or describes the customer and/or device. For example, the user device may be authenticated with the DRM server. Authentication may include the device identifying itself as registered to a specific user account. The user account may be the same the account the consumer or user device holds with the merchant server, or (more typically) a separate account that the consumer or user device holds with the DRM system to which the DRM server belongs.

In many embodiments of the invention, the device may send information that identifies the brand and model of the device, or the graphics and audio capabilities of the device (e.g., high definition, multi-channel audio, MPEG4 decoding). The information can be used to help authenticate the device to the DRM system and determine the appropriate format of the content to provide to the device. Systems and processes for collecting information about a user device and representing the information using a device match data token include those disclosed in U.S. patent application Ser. No. 13/339,315 entitled "Binding of Cryptographic Content Using Unique Device Characteristics with Server Heuristics," the disclosure of which is hereby incorporated by reference in its entirety.

The DRM server validates (116) the ticket token, e.g., by checking that the token has not yet been used and is not expired. The DRM server uses the ticket token to determine the electronic ticket to which it refers and customer information for the customer who sent the request.

The DRM server may associate (118) the electronic ticket with the customer's user account and register the user device to the user account if they are not already so registered, using the customer information associated with the ticket token and device match data it may have received from the user device.

In many embodiments of the invention, the DRM server may also verify the play request according to certain rules using the ticket token and/or a device match data token. For example, the DRM server may enforce concurrency and device rules on the playback of content. A concurrency rule may stipulate that only one device on the user account can play back any content at a time, or that a specific piece of content may only be played on one device at a time. Device rules may include limiting high definition content to user devices such as set-top boxes connected to television displays. A device match data token identifies the type of device so the DRM server can look up the device type to determine the appropriate format of content.

In many embodiments of the invention, the electronic ticket and/or the ticket token contain information to identify the license under which the content can be played. The DRM server can use the ticket information to retrieve the license information and generate or retrieve access information that the user device can use to access or decrypt the requested content. Access information can include (but is not limited to) a top level index file of the digital content, an identifier or location pointer for the digital content, and/or cryptographic data that can be used to access and/or decrypt the content. In several embodiments of the invention, a top level index file describes the location and content of container files containing streams of media that can be utilized by the playback device to stream and playback content. In adaptive bitrate streaming systems, the top level index file typically references the alternative streams that the playback device can switch between. Systems and methods for automatically generating top level index files for use in adaptive bitrate stream include those disclosed in U.S. patent application Ser. No. 13/341,789 entitled "Systems and Methods for Automatically Generating Top Level Index Files," filed on Dec. 30, 2011, the disclosure of which is hereby incorporated by reference in its entirety.

The DRM server sends (120) the electronic ticket to the user device. In several embodiments, the electronic ticket embedded in another file. The ticket may be embedded in a file that also contains the content that was requested, e.g., in the header of a multimedia container file. In many embodiments, the DRM server also sends the access information that is used to access or play back the content that was requested. The DRM server invalidates the token by expiring (122) it.

Using the received electronic ticket and access information, the user device can play back the requested content via download or streaming. In many embodiments of the invention, the content is hosted on a content server that is accessible to the user device over a network. The user device may request the content from the content server. The content may be downloaded and played (124) during download or after downloading is complete, or streamed and played while being transferred to the user device. The user device may send a signal such as a "heartbeat" to the DRM server to let the server know that it is currently playing back content and/or the position in the file that is being played back. The DRM server can use this information for functions such as providing a resume feature so that the customer can stop playback and restart at the same position on the same or a different user device.

Although a specific process is illustrated in FIG. 2, any of a variety of processes for utilizing an electronic ticket and a ticket token that references the electronic ticket for providing a user device with access to purchased digital content can be utilized in accordance with embodiments of the invention.

Figure 2A:
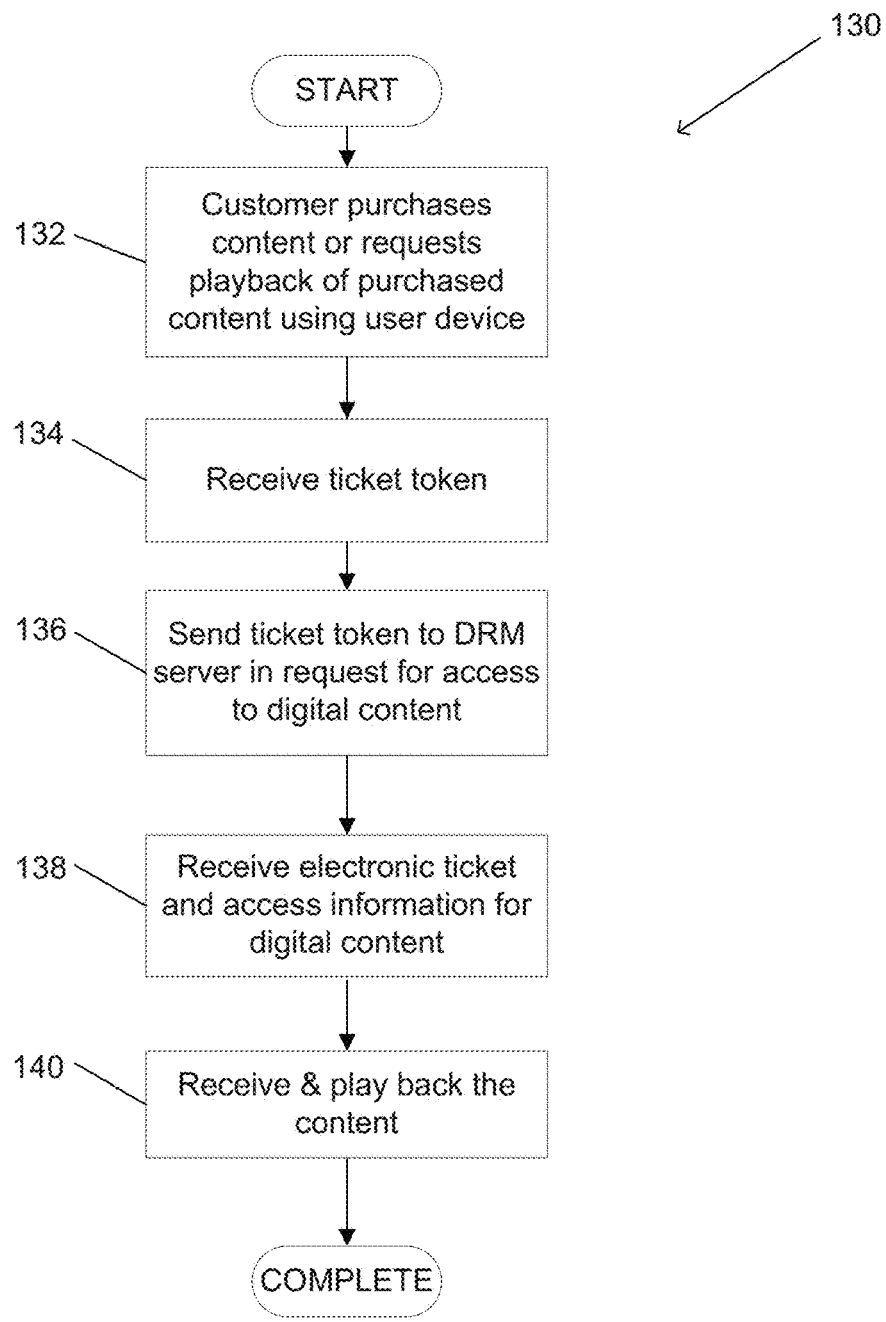
FIG. 2A is a flow chart illustrating a process for providing a user device with access to digital content using an electronic ticket and ticket token on a user device, in accordance with an embodiment of the invention.

Processes similar to the process illustrated in FIG. 2 may be implemented by configuring user devices and servers to exchange electronic tickets and ticket tokens. A generalized process 130 for using a user device to obtain access to digital content purchased via a merchant using an electronic ticket and an associated electronic token in accordance with an embodiment of the invention is shown in FIG. 2A. A customer uses a user device to purchase (132) content or request the playback of purchased content. The user device receives (134) a ticket token from a merchant server. The user device sends (136) the ticket token to a DRM server in a request for access to digital content. The user device receives (138) an electronic ticket that is referenced by or otherwise associated with the ticket token and access information for the digital content from the DRM server. Using the electronic ticket and access information, the user device receives and plays back (140) the requested content. In many embodiments of the invention, the content is hosted on a content server that is accessible to the user device over a network. Although a specific process is illustrated in FIG. 2A, any of a variety of processes for utilizing an electronic ticket and a ticket token that references the electronic ticket for providing a user device with access to purchased digital content can be utilized in accordance with embodiments of the invention.

Figure 2B:
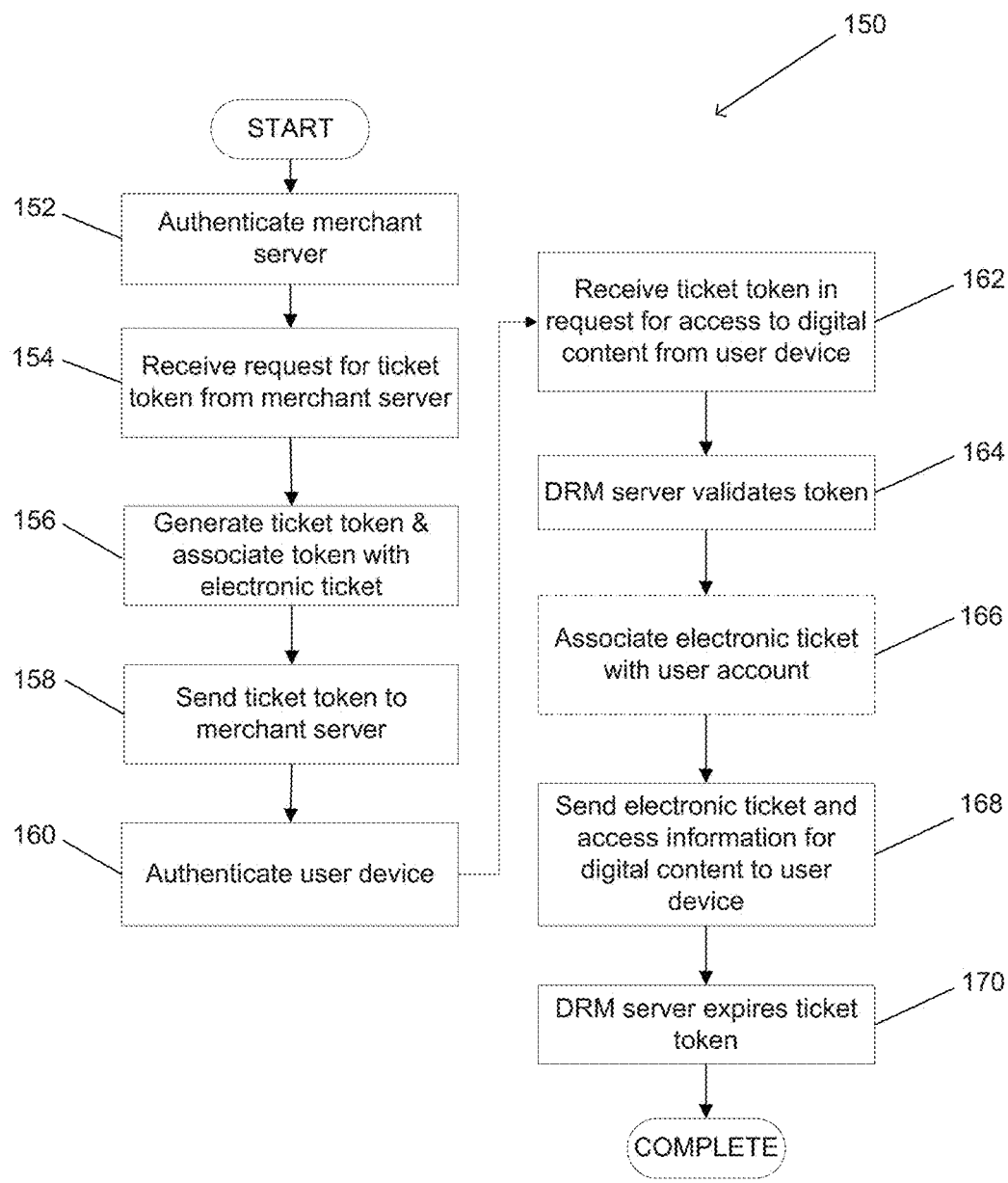
FIG. 2B is a flow chart illustrating a process for providing a user device with access to digital content using an electronic ticket and ticket token on a DRM server, in accordance with an embodiment of the invention.

A generalized process 150 for using a DRM server to provide a user device with access to digital content purchased via a merchant using an electronic ticket and an associated electronic token in accordance with an embodiment of the invention is shown in FIG. 2B. The DRM server authenticates (152) a merchant server. The DRM server receives (154) a request for a ticket token from a merchant server. The DRM server generates (156) a ticket token and associates the token with an electronic ticket. If there is no preexisting ticket (e.g., for a new purchase), the DRM server also creates the electronic ticket. The DRM server sends (158) the ticket token to the merchant server for delivery to a user device. The DRM server authenticates (160) a user device. The DRM server receives (162) the ticket token in a request for access to digital content from the user device and validates (164) the token. If user account information is provided, the DRM server associates (166) the electronic ticket with the user account. The DRM server sends (168) the electronic ticket referenced by or otherwise associated with the ticket token to the user device with access information for the digital content that was requested. The DRM server expires (170) the ticket token. Although a specific process is illustrated in FIG. 2B, any of a variety of processes for utilizing an electronic ticket and a ticket token that references the electronic ticket for providing a user device with access to purchased digital content can be utilized in accordance with embodiments of the invention. User devices and DRM servers that can utilize electronic tickets and ticket tokens in accordance with embodiments of the invention are discussed further below.

User Devices

Figure 3:
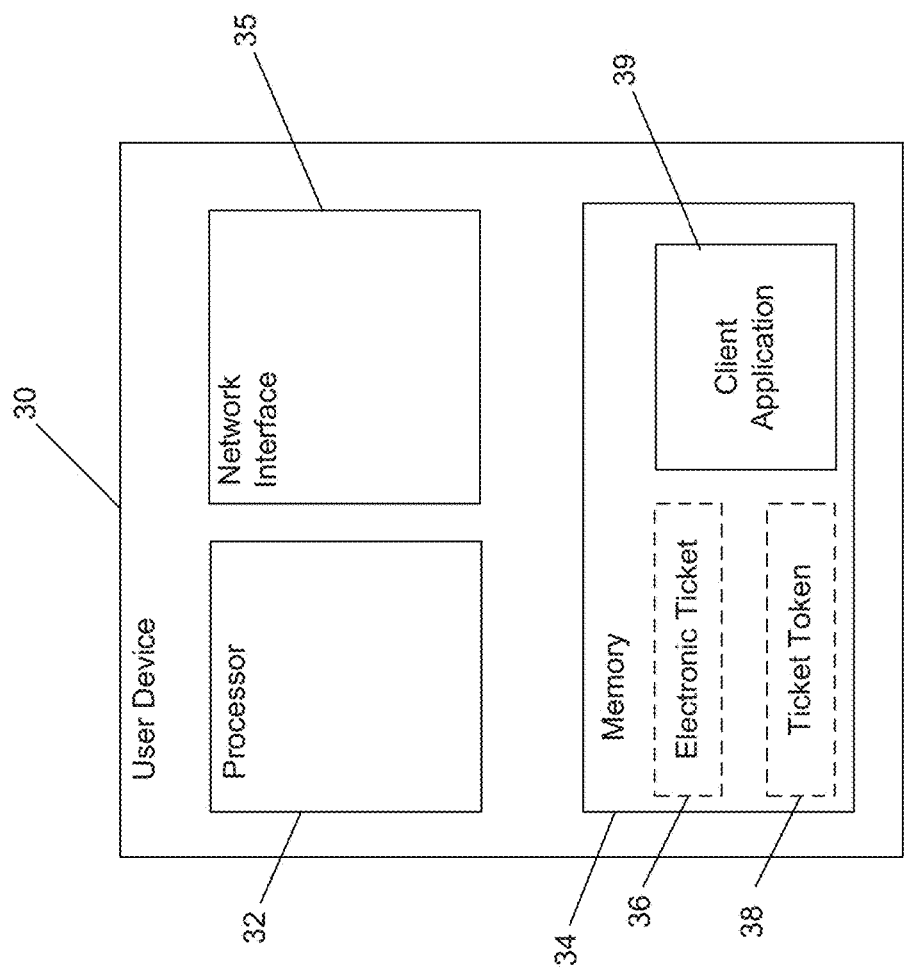
FIG. 3 conceptually illustrates a user device, which stores an electronic ticket and ticket token in memory, in accordance with an embodiment of the invention.
Figure 4:
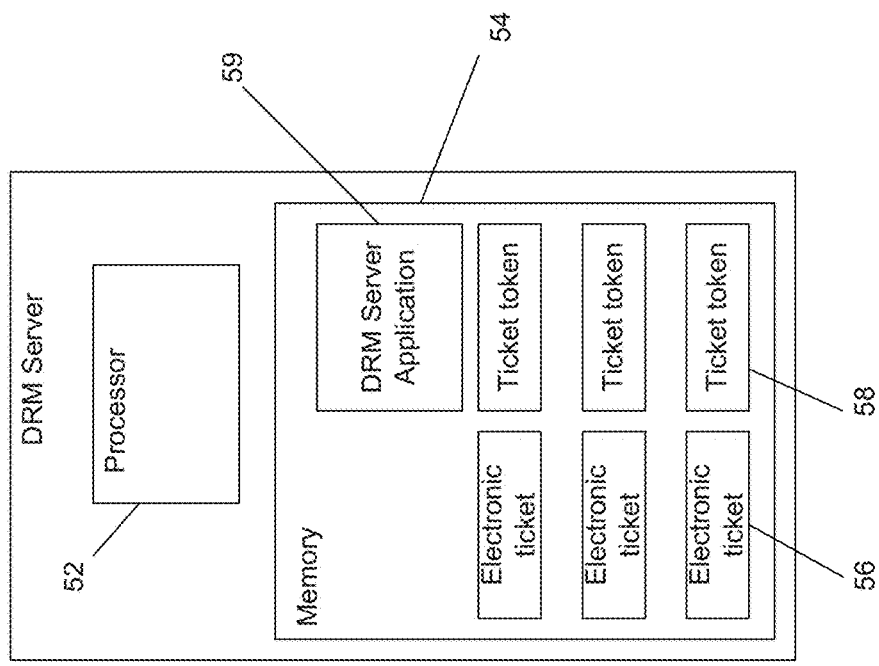
FIG. 4 conceptually illustrates a DRM server, which stores electronic tickets and ticket tokens in memory, in accordance with an embodiment of the invention.

In many embodiments of the invention, an electronic ticket is stored on a playback device to enable the user device to access content through a DRM system using the electronic ticket. A user device configured to access purchased content using electronic tickets in accordance with an embodiment of the invention is shown in FIG. 3. The playback device 30 includes a processor 32, memory 34, and a network interface 35. In the illustrated embodiment, the electronic tickets 36 and ticket tokens 38 can be stored in memory. Typically, the memory is non-volatile memory to provide persistent storage of the electronic tickets 36 and the ticket tokens 38. In a number of embodiments, the electronic ticket 38 may be contained inside a container file together with the content to which it refers. In several embodiments, a ticket may be stored on a purchaser's user device after purchase, may be transferred to another device if given as a gift, and may be deleted in its isolated form (i.e., outside a container file) from the device when it is torn. Tickets are typically treated this way in a disconnected playback mode. In several embodiments, a client application 39 configures the user device to communicate with the merchant server to purchase content and obtain ticket tokens. The client application 39 also configures the user device to authentic itself with a DRM server and to request cryptographic information to play back content using a ticket token and/or exchange the ticket token for an electronic ticket. Although a specific user device architecture is illustrated in FIG. 3, any of a variety of architectures that are capable of managing interactions with servers and playback of digital content in the manner outlined above can be utilized in accordance with embodiments of the invention can DRM Servers In many embodiments of the invention, electronic tickets and ticket tokens may be stored on a merchant server or a DRM server (e.g., in a database) for reference, to track purchases, and to provide user devices with access to content. A merchant or DRM server may look up an electronic ticket using fields such as (but not limited to) a customer email address, merchant identifier, content identifier, or merchant transaction identifier. A DRM server configured to issue electronic tickets and ticket tokens and to provide cryptographic information enabling playback of DRM protected content in accordance with an embodiment of the invention is shown in FIG. 4. The DRM server includes a processor 52 and memory 54. In the illustrated embodiment, the memory 54 includes multiple electronic tickets 56 and ticket tokens 58. As is discussed above, the DRM server can be configured by DRM server application software 59 to manage the generation of electronic tickets, the issuance of ticket tokens associated with the electronic tickets, and the association of electronic tickets with users and/or user devices. In addition, the DRM server application software 59 can manage the issuance of cryptographic information (not shown) to playback devices that are authorized to playback content, the authorization of which is evidenced by an electronic ticket.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A user device, comprising:
    a processor;
    a network interface; and
    memory configured to store:
        an electronic ticket indicating whether access rights for playback of digital content associated with the electronic ticket have been granted by a DRM server,
            where the electronic ticket includes a torn status, the torn status indicating whether the digital content has been accessed; and
            where the electronic ticket enables playback of digital content when the torn status is TORN as opposed to UNTORN;
    wherein the processor is configured by an application to:
        send a request for digital content;
        receive the electronic ticket associated with a ticket token,
            where the electronic ticket enables playback of requested digital content,
            where the electronic ticket is received having a torn status of UNTORN,
            and where the ticket token signifies authorization of digital rights access of the digital content;
        store the received electronic ticket in the memory where the electronic ticket maintains a torn status of UNTORN until the digital content associated with the electronic ticket is accessed for the first time;
        request the digital content associated with the electronic ticket from a content provider system;
        receive the requested digital content from the content provider system;
        access the digital content for the first time using the specific electronic ticket;
        change the torn status of the electronic ticket in the memory to TORN when the digital content is accessed for the first time using that specific electronic ticket; and
        play back the requested digital content only when the electronic ticket has a torn status of TORN.

2. The user device of claim 1, wherein the electronic ticket is an XML file.

3. The user device of claim 1, wherein the electronic ticket identifies purchased digital content.

4. The user device of claim 3, wherein the electronic ticket includes a characteristic of the purchased content selected from the group consisting of: information identifying the content that was purchased, a license indicating how the content can be played back, a purchase price, a merchant transaction identifier, the identification of a customer who purchased the ticket, and the identification of a customer owning the ticket.

5. The user device of claim 1, wherein the electronic ticket is associated with cryptographic data that can be used to access the digital content to which the electronic ticket refers.

6. The user device of claim 1, wherein the ticket token references the electronic ticket, a customer, and the requested digital content.

7. The user device of claim 1, wherein the processor is further configured to receive access information for the digital content.

8. The user device of claim 7, wherein the access information includes at least one piece of information selected from the group consisting of: a top level index of the digital content, an identifier for the digital content, and cryptographic data that can be used to access the digital content.

9. The user device of claim 1, wherein the electronic ticket is embedded in the header of a multimedia file.

10. A method for enabling playback of digital content on a user device using an electronic ticket and a ticket token, the method comprising:
    sending a request for digital content from a user device to a merchant server;
    receiving the electronic ticket associated with a ticket token from the DRM server using the user device,
        wherein the electronic ticket indicates whether access rights for playback of digital content associated with the electronic ticket have been granted by a DRM server,
        wherein the electronic ticket includes a torn status, the torn status indicating whether the digital content has been accessed;
        wherein the electronic ticket enables playback of the requested digital content when the torn status is TORN as opposed to UNTORN;
        wherein the electronic ticket is received having a torn status of UNTORN; and
        wherein the ticket token signifies authorization of digital rights access of the digital content;
    storing the received electronic ticket in memory, wherein the electronic ticket maintains a torn status of UNTORN until the digital content associated with the electronic ticket is accessed for the first time;
    downloading the digital content associated with the electronic ticket from a content server using the user device;
    accessing the digital content for the first time using the specific electronic ticket;
    changing the torn status of the electronic ticket to TORN when the digital content is accessed for the first time using that specific electronic ticket; and
    playing back the requested digital content only when the electronic ticket has a torn status of TORN.

11. The method of claim 10, wherein the electronic ticket is an XML file.

12. The method of claim 10, wherein the electronic ticket identifies purchased digital content.

13. The method of claim 12, wherein the electronic ticket includes a characteristic of the purchased content selected from the group consisting of: information identifying the content that was purchased, a license indicating how the content can be played back, a purchase price, a merchant transaction identifier, the identification of a customer who purchased the ticket, and the identification of a customer owning the ticket.

14. The method of claim 10, wherein the electronic ticket is associated with cryptographic data that can be used to access the digital content to which the electronic ticket refers.

15. The method of claim 10, wherein the ticket token references the electronic ticket, a customer, and the requested digital content.

16. The method of claim 10, further comprising receiving access information for the digital content.

17. The method of claim 16, wherein the access information includes at least one piece of information selected from the group consisting of: a top level index of the digital content, an identifier for the digital content, and cryptographic data that can be used to access the content.

18. The method of claim 10, wherein the electronic ticket is embedded in the header of a multimedia file.

19. The user device of claim 1, wherein the memory is configured to also store the ticket token; and
    wherein the processor is configured by the application to:
        receive the ticket token from a merchant server, wherein the ticket token is generated by the DRM server and associated with the electronic ticket that enables playback of the requested digital content; and
        send the ticket token to the DRM server to be exchanged with the electronic ticket,
        where the ticket token is exchanged when the DRM authenticates the ticket token; and
        where the ticket token is expired during the exchange process.

20. The method of claim 10 further comprising:
receiving the ticket token associated with the electronic ticket from the merchant server using the user device, wherein the ticket token is generated by a DRM server; and
sending the ticket token to the DRM server, using the user device, to be exchanged with the electronic ticket,
wherein the ticket token is exchanged when the DRM authenticates the ticket token; and
wherein the ticket token is expired during the exchange process.

21. The user device of claim 1, wherein the processor is configured by the application to:
expire the electronic ticket after a period of time of having the torn status of TORN.

22. The method of claim 10 further comprising: expiring the electronic ticket after a period of time of having the torn status of TORN.

* * * * *